(12) United States Patent
Taylor et al.

(10) Patent No.: US 9,191,490 B2
(45) Date of Patent: Nov. 17, 2015

(54) ELECTRONIC SYSTEM AND CONTROLLING METHOD THEREOF

(75) Inventors: Matthew W. Taylor, Bellevue, WA (US); Tsung-Pao Kuan, Taoyuan County (TW); Sung-Shih Yu, Taoyuan County (TW); John C. Wang, Taoyuan County (TW)

(73) Assignee: HTC Corporation, Taoyuan District, Taoyuan (TW)

( * ) Notice: Subject to any disclaimer, the term of this patent is extended or adjusted under 35 U.S.C. 154(b) by 360 days.

(21) Appl. No.: 13/397,692

(22) Filed: Feb. 16, 2012

(65) Prior Publication Data

US 2013/0045676 A1    Feb. 21, 2013

Related U.S. Application Data

(63) Continuation-in-part of application No. 12/904,175, filed on Oct. 14, 2010.

(51) Int. Cl.
*H04W 24/00* (2009.01)
*H04M 1/725* (2006.01)

(52) U.S. Cl.
CPC ........ *H04M 1/72577* (2013.01); *H04M 1/7253* (2013.01); *H04M 2250/10* (2013.01)

(58) Field of Classification Search
CPC ..... H04W 12/06; H04W 12/12; H04W 64/00; H04W 4/021; H04W 4/025; H04W 4/023; H04W 4/02; H04W 12/00; H04W 4/00; H04W 24/06; H04H 20/57; H04H 20/61; H04M 2250/10; H04M 2250/12

USPC ............... 455/39, 411, 414.1, 418, 41.2, 455/456.1–456.4, 456.6
See application file for complete search history.

(56) References Cited

U.S. PATENT DOCUMENTS 7,623,845 B2   11/2009 Lai
2003/0096623 A1*  5/2003 Kim .............................. 455/456

(Continued)

FOREIGN PATENT DOCUMENTS

CN        1964523 A    5/2007
CN      101625546 A    1/2010

(Continued)

OTHER PUBLICATIONS

Office action mailed on Jan. 4, 2013 for the U.S. Appl. No. 12/904,175, filed Oct. 14, 2010, p. 1-11.

(Continued)

*Primary Examiner* — Edward Urban
*Assistant Examiner* — Max Mathew
(74) *Attorney, Agent, or Firm* — Winston Hsu; Scott Margo

(57) ABSTRACT

An electronic system includes a first wireless transceiving module having a device identification code and a portable device. The portable device may include a second wireless transceiving module, and a processor. The second wireless transceiving module obtains the device identification code from the first wireless transceiving module. When the second wireless transceiving module obtains the device identification code from the first wireless transceiving module, the processor checks whether the device identification code matches to a pre-built identification code; and when the device identification code matches to the pre-built identification code, the portable device automatically determines a position of the portable device, and displays a map related to the position of the portable device in a display.

15 Claims, 7 Drawing Sheets

(56) References Cited

U.S. PATENT DOCUMENTS

| | | |
|---|---|---|
| 2005/0221841 A1 | 10/2005 | Piccionelli |
| 2006/0052112 A1* | 3/2006 | Baussi et al. ............... 455/456.1 |
| 2006/0104600 A1* | 5/2006 | Abrams ........................ 386/46 |
| 2006/0258368 A1* | 11/2006 | Granito et al. ............. 455/456.1 |
| 2007/0298791 A1* | 12/2007 | Waung ....................... 455/435.1 |
| 2009/0322890 A1 | 12/2009 | Bocking |
| 2011/0021243 A1 | 1/2011 | Shin |
| 2011/0063098 A1* | 3/2011 | Fischer et al. ................ 340/439 |
| 2011/0105082 A1* | 5/2011 | Haley .......................... 455/411 |
| 2011/0105097 A1* | 5/2011 | Tadayon et al. ............... 455/418 |
| 2011/0223974 A1 | 9/2011 | Agevik et al. |
| 2014/0113584 A1* | 4/2014 | Narkar ......................... 455/406 |
| 2014/0358971 A1* | 12/2014 | Aminzade et al. ............ 707/780 |

FOREIGN PATENT DOCUMENTS

| | | |
|---|---|---|
| CN | 101674368 A | 3/2010 |
| CN | 101848273 A | 9/2010 |
| GB | 2 396 779 A | 6/2004 |
| TW | M254389 | 1/2005 |
| TW | 200603592 | 1/2006 |
| TW | 200623809 | 7/2006 |
| TW | M317057 | 8/2007 |
| TW | I310800 | 6/2009 |
| WO | WO 2012/019794 * 2/2012 ............ G06F 17/30 |

OTHER PUBLICATIONS

Office action mailed on May 15, 2013 for the U.S. Appl. No. 12/904,175, filed Oct. 14, 2010, p. 1-11.

Office action mailed on Aug. 28, 2013 for the China application No. 201110180816.3, filing date Jun. 30, 2011, p. 1-10.

Office action mailed on May 30, 2014 for the Taiwan application No. 100120392, filing date: Jun. 10, 2011, p. 1-11.

Office action mailed on Nov. 13, 2014 for the U.S. Appl. No. 12/904,175, filed Oct. 14, 2010, p. 1-16.

Office Action mailed on Apr. 21, 2015 for the U.S. Appl. No. 12/904,175, filed Oct. 14, 2010, p. 1-13.

* cited by examiner

ELECTRONIC SYSTEM AND CONTROLLING METHOD THEREOF

CROSS REFERENCE TO RELATED APPLICATIONS

This is a continuation-in-part application of U.S. application Ser. No. 12/904,175, filed Oct. 14, 2010, which is included herein by reference.

BACKGROUND

1. Technical Field

The present disclosure relates to an electronic system and a related controlling method, and more particularly, to an electronic system and a related controlling method for automatically executing a corresponding pre-assigned instruction (such as, automatically disabling a SMS program) when a searched device identification code matches to its pre-built identification code(s).

2. Background

In the modern information society with flourishing wireless communications, a portable device, such as a cell phone, has become one of the most common communication tools. The cell phone allows users to perform wireless communications anytime and anywhere, and thereby to perform voice communications conveniently.

Since the cell phone brings more convenience to users, the users become too depend upon the cell phone. However, this may result in some problems with the users under some conditions. As an illustration, the users may launch a SMS program for texting on the cell phone while they are driving, which is very dangerous and may cause accidents. As another illustration, when the users enter a cinema, a sudden large ring volume may bother the users and other people if an incoming call is received by the cell phone at this time.

Therefore, how to improve convenience of the portable device, and increase more additional features to the portable device become important topics in this field.

SUMMARY

According to the present disclosure, roughly described, an electronic system and a related controlling method for automatically executing a corresponding pre-assigned instruction when a searched device identification code matches to its pre-built identification code (s).

According to one embodiment, an electronic system is provided. The electronic system may include a first wireless transceiving module and a portable device. The first wireless transceiving module has a device identification code. The portable device may include a second wireless transceiving module, a storage module, and a processor. The second wireless transceiving module may be used for communicating with the first wireless transceiving module in order to obtain the device identification code from the first wireless transceiving module. The storage module stores at least one set of data, wherein each set of data may comprise a pre-built identification code and a corresponding pre-assigned instruction. The processor may be coupled to the second wireless transceiving module and the storage module. When the second wireless transceiving module obtains the device identification code from the first wireless transceiving module, the processor searches for the at least one set of data to check whether the device identification code matches to the pre-built identification code stored in the storage module; and when the device identification code matches to the pre-built identification code, the processor automatically executes the corresponding pre-assigned instruction.

In one embodiment, when the device identification code matches to the pre-built identification code, the processor may automatically disable a short message service (SMS) program.

According to one embodiment, a method for controlling an electronic system is provided. The electronic system may include a first wireless transceiving module having a device identification code and a portable device having a second wireless transceiving module. The method may include the steps of: communicating with the first wireless transceiving module in order to obtain the device identification code; storing at least one set of data, wherein each set of data comprises a pre-built identification code and a corresponding pre-assigned instruction; when the device identification code is obtained from the first wireless transceiving module, searching for the at least one set of data to check whether the device identification code matches to the pre-built identification code; and when the device identification code matches to the pre-built identification code, automatically executing the corresponding pre-assigned instruction.

According to one embodiment, an electronic system is provided. The electronic system may include a first wireless transceiving module and a portable device. The first wireless transceiving module has a device identification code. The portable device may include a second wireless transceiving module, and a processor. The second wireless transceiving module may be used for communicating with the first wireless transceiving module in order to obtain the device identification code from the first wireless transceiving module. The processor may be coupled to the second wireless transceiving module. When the second wireless transceiving module obtains the device identification code from the first wireless transceiving module, the processor checks whether the device identification code matches to a pre-built identification code; and when the portable device automatically determines a position of the portable device, and displays a map related to the position of the portable device in a display.

According to one embodiment, a method for controlling an electronic system is provided. The electronic system may include a first wireless transceiving module having a device identification code and a portable device having a second wireless transceiving module. The method may include the steps of: communicating with the first wireless transceiving module in order to obtain the device identification code; when the device identification code is obtained from the first wireless transceiving module, checking whether the device identification code matches to a pre-built identification code; and when the device identification code matches to the pre-built identification code, automatically determining a position of the portable device, and displays a map related to the position of the portable device.

These and other objectives of the present disclosure will no doubt become obvious to those of ordinary skill in the art after reading the following detailed description of the preferred embodiment that is illustrated in the various figures and drawings.

DETAILED DESCRIPTION

Figure 1:
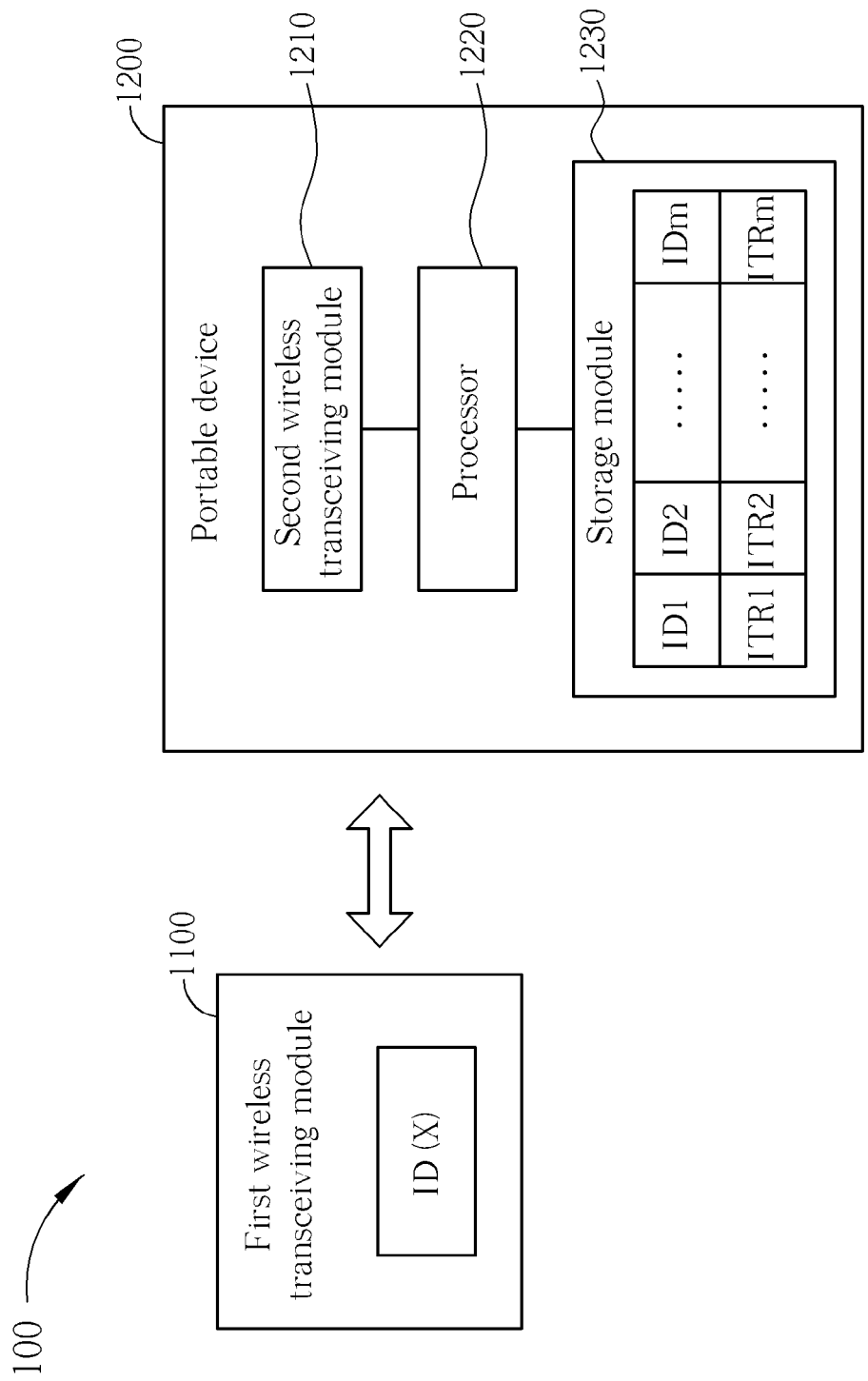
FIG. 1 is a block diagram of an electronic system.

Please refer to FIG. 1. FIG. 1 is a block diagram of an electronic system 100. As shown in FIG. 1, the electronic system 100 may include a first wireless transceiving module 1100 and a portable device 1200. The first wireless transceiving module 1100 has a device identification code ID (X). The portable device 1200 may include, but is not limited to, a second wireless transceiving module 1210, a storage module 1230, and a processor 1220. The second wireless transceiving module 1210 may be used for communicating with the first wireless transceiving module 1100 in order to obtain the device identification code ID (X) from the first wireless transceiving module 1100. The storage module 1230 may store at least one set of data. In this embodiment, the storage module 1230 stores a plurality of sets of data, wherein each set of data may comprise a pre-built identification code (e.g., ID1~IDm) and a corresponding pre-assigned instruction (e.g. ITR1~ITRm). The number of the pre-built identification codes and the number of the corresponding pre-assigned instructions stored in the storage module 1230 may not be limited.

In addition, the processor 1220 may be coupled to the second wireless transceiving module 1210 and the storage module 1230. What calls for special attention is that when the second wireless transceiving module 1210 obtains the device identification code ID (X) from the first wireless transceiving module 1100, the processor 1220 searches for the at least one set of data to check whether the device identification code ID(X) matches to the pre-built identification code (s) ID1~IDm stored in the storage module 1230; and when the device identification code ID(X) matches to any one of the pre-built identification code(s) ID1~IDm, the processor 1220 automatically executes the corresponding pre-assigned instruction(s) ITR1~ITRm.

In the following descriptions, several examples are cited for illustrating how the processor 1220 may determine whether to automatically execute the corresponding pre-assigned instruction(s) ITR1~ITRm. Be noted that, in one embodiment, the pre-assigned instruction may indicate the processor 1220 to enable a corresponding application; in another embodiment, the pre-assigned instruction may indicate the processor 1220 to disable a corresponding application, which also belongs to the scope of the present disclosure.

In a first case, assume that the first wireless transceiving module 1100 is disposed on a transport (e.g., a car). When a user of the portable device 1200 gets into the car, the second wireless transceiving module 1210 may be able to search for the first wireless transceiving module 1100 so as to obtain the device identification code ID(X) from the first wireless transceiving module 1100. At this time, the processor 1220 starts to search for the at least one set of data to check whether the device identification code ID (X) matches to any one of the pre-built identification code(s) ID1~IDm stored in the storage module 1230. For example, when the device identification code ID(X) matches to the pre-built identification code ID1, the processor 1220 may automatically disable at least one of the following functions of the portable device 1200 including a short message service (SMS) program, a multimedia messaging service (MMS), a voice recognition, a speaker function, a microphone function, a data input function, a keyboard function, and a display function (i.e., the corresponding pre-assigned instruction ITR1).

In a second case, assume that the first wireless transceiving module 1100 is disposed in a cinema. When a user of the portable device 1200 enters the cinema, the second wireless transceiving module 1210 may be able to search for the first wireless transceiving module 1100 so as to obtain the device identification code ID(X) from the first wireless transceiving module 1100. At this time, the processor 1220 may start to search for the at least one set of data to check whether the device identification code ID(X) matches to any one of the pre-built identification code(s) ID1~IDm stored in the storage module 1230. For example, when the device identification code ID(X) matches to the pre-built identification code ID2, the processor 1220 may automatically enable a mute function of the portable device 1200 (i.e., the corresponding pre-assigned instruction ITR2).

Certainly, the abovementioned electronic system 100 is presented merely to illustrate a practicable embodiment of the present disclosure. In other embodiments, more functions may be designed to portable device 1200 in order to provide more choices to the portable device 1200. For example, a speed detecting function may be added into the portable device 1200.

Figure 2:
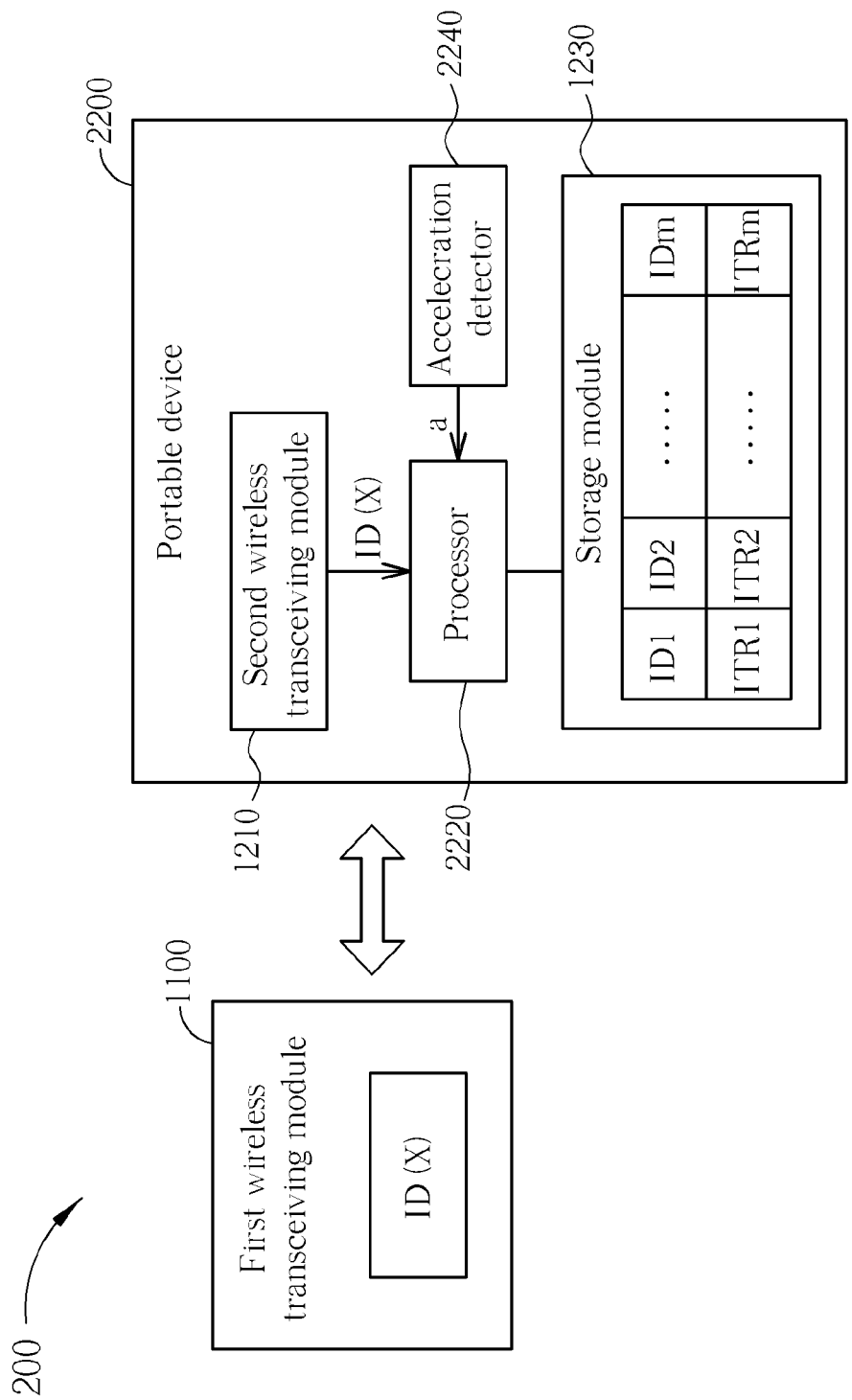
FIG. 2 is a block diagram of an electronic system.

Please refer to FIG. 2. FIG. 2 is a block diagram of an electronic system 200 according to a second embodiment of the present disclosure. In FIG. 2, the architecture of the electronic system 200 is similar to that of the electronic system 100, and the difference between them is that a portable device 2200 of the electronic system 200 further includes an acceleration detector 2240 coupled to the processor 2220. The acceleration detector 2240 may detect an acceleration behavior of the portable device 2200 to be inputted to the processor 2220. In this embodiment, when the device identification code ID(X) matches to any one of the pre-built identification code(s) ID1~IDm, the processor 2220 may determine whether to execute the corresponding pre-assigned instruction ITR1~ITRm according to the acceleration behavior.

As an illustration, in a third case, assume that the first wireless transceiving module 1100 is disposed on a transport (e.g., a car). When a user of the portable device 2200 gets into the car, the second wireless transceiving module 1210 may be able to search for the first wireless transceiving module 1100 so as to obtain the device identification code ID (X) from the first wireless transceiving module 1100. At this time, the processor 2220 may start to search for the at least one set of data to check whether the device identification code ID(X) matches to any one of the pre-built identification code(s) ID1~IDm stored in the storage module 1230. Under this condition, when the device identification code ID(X) matches to the pre-built identification code ID1, the acceleration detector 2240 detects the acceleration behavior and then the processor 2220 may determine whether to execute the corresponding pre-assigned instruction ITR1 according to the acceleration behavior. For example, when the acceleration behavior is determined to be car moving (i.e., the speed is greater than a threshold TH for a while), which means that the portable device 2200 is on-the-move, the processor 2220 may determine to execute the corresponding pre-assigned instruction ITR1 (that is, automatically disabling at least one of the following functions of the portable device 2200 including a SMS program, a multimedia messaging service (MMS), a voice recognition, a speaker function, a microphone function, a data input function, a keyboard function, and a display function). When the acceleration behavior is determined to be car stop (i.e., the speed is smaller than the threshold TH for a while), which means the portable device 2200 is almost stationary, the processor 2220 may determine to not execute the corresponding pre-assigned instruction ITR1.

Please note that the acceleration detector 2240 may be implemented by a G sensor, a Wi-Fi module, an RFID module, a base station, a radio signal transceiving module, or a global positioning system (GPS) module, but this should not be considered as limitations of the present disclosure. Moreover, the first wireless transceiving module 1100 and the second wireless transceiving module 1210 may be implemented by a Bluetooth module, a Wi-Fi module, an RFID module, a base station, a radio signal transceiving module, a ZigBee module, or an ANT/ANT+ module, respectively, but the present disclosure is not limited to this only. The portable device 1200/2200 may be a cell phone, a personal digital assistant (PDA), a PDA phone, a smart phone, a hand held device, a e-book, a tablet, or a laptop. But this is not meant to be a limitation of the present disclosure, and the portable device 1200/2200 may be a portable device of other types.

As may be known from descriptions above, the processor 1220/2220 may be able to determine whether to automatically execute the corresponding pre-assigned instruction ITR1~ITRm when the device identification code ID(X) matches to the pre-built identification code ID1~IDm. The user does not need to enable or disable the corresponding application(s) manually, such as disabling a SMS program or enabling a mute function of the portable device 1200/2200. Therefore, the convenience of the portable device may be substantially improved.

On the other hand, since the second wireless transceiving module 1210 (e.g., a Bluetooth module, a Wi-Fi module, an RFID module, a base station, a radio signal transceiving module, a ZigBee module, or an ANT/ANT+ module) and the acceleration detector 2240 (e.g., a G sensor or a GPS module) consume power; none of them may need to be continuously activated. For this reason, the second wireless transceiving module 1210 and/or the acceleration detector 2240 may be activated only when a command related to the corresponding application is received by the processor 1220/2220. For example, only when a command related to launching a SMS program (or receiving an incoming call) is received by the processor 1220/2220, the second wireless transceiving module 1210 and/or the acceleration detector 2240 will be activated.

Figure 3:
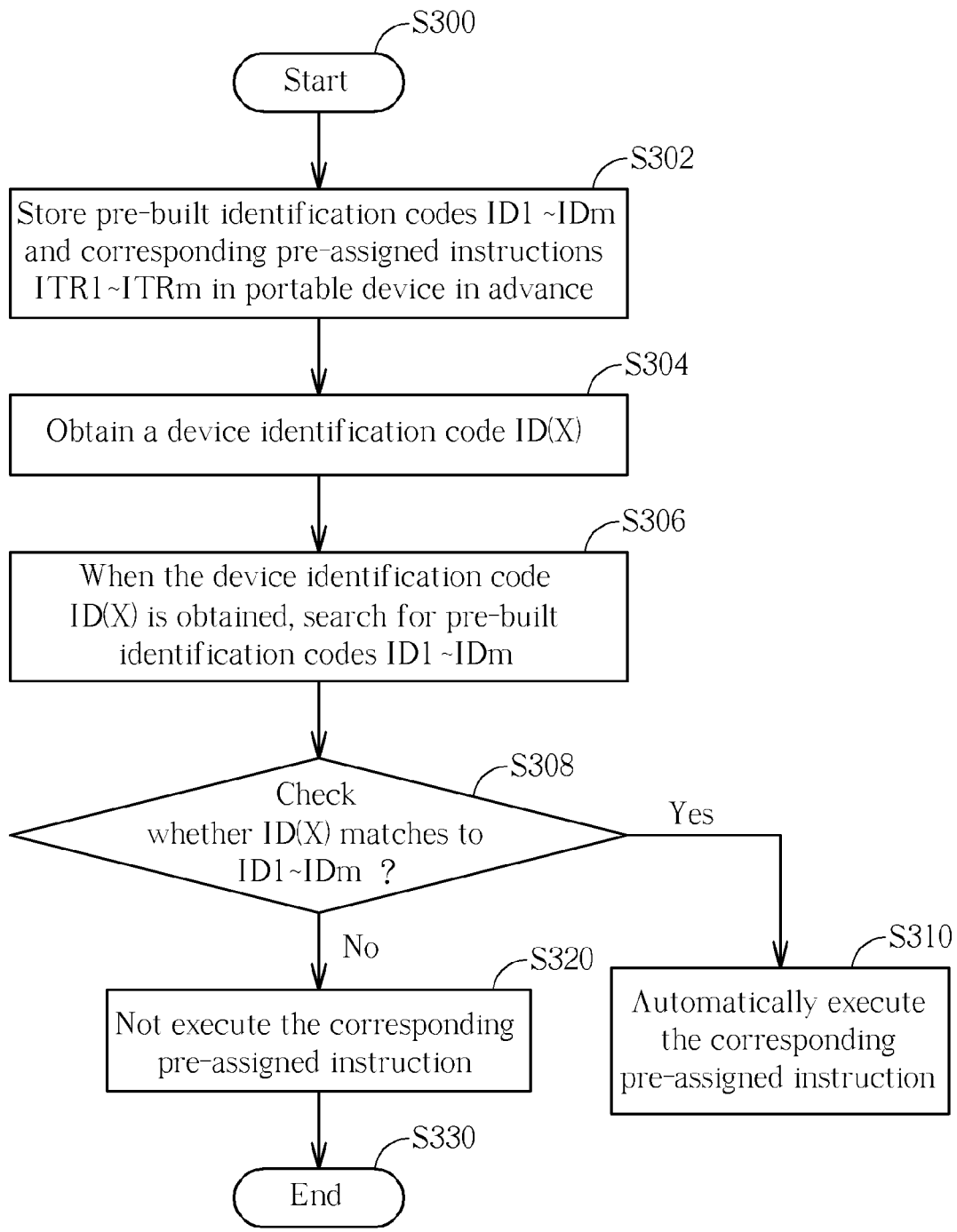
FIG. 3 is flowchart illustrating a method for controlling an electronic system according to an exemplary embodiment of the present disclosure.

Please refer to FIG. 3. FIG. 3 is flowchart illustrating a method for controlling an electronic system according to an exemplary embodiment of the present disclosure. Please note that the following steps are not limited to be performed according to the exact sequence shown in FIG. 3 if a roughly identical result may be obtained. The method includes, but is not limited to, the following steps:

Step S300: Start.

Step S302: Store at least one set of data in the portable device in advance, wherein each set of data comprises a pre-built identification code and a corresponding pre-assigned instruction.

Step S304: Communicate with the first wireless transceiving module in order to obtain the device identification code.

Step S306: When the device identification code is obtained from the first wireless transceiving module, search for the at least one set of data.

Step S308: Check whether the device identification code matches to the pre-built identification code. When the device identification code matches to the pre-built identification code, go to Step S310; otherwise, go the Step S320.

Step S310: Automatically execute the corresponding pre-assigned instruction.

Step S320: Not execute the corresponding pre-assigned instruction.

Step S330: End.

How each element operates may be known by combining the steps shown in FIG. 3 and the elements shown in FIG. 1. Be noted that the step S302 is executed by the storage module 1230, the step S304 is executed by the second wireless transceiving module 1210, and the steps S306, S308, S310 and S320 are executed by the processor 1220. In details, in Step S302, the storage module 1230 may store at least one set of data, wherein each set of data may comprise a pre-built identification code (e.g., ID1~IDm) and a corresponding pre-assigned instruction (e.g. ITR1~ITRm). In Step S304, the second wireless transceiving module 1210 may be used for communicating with the first wireless transceiving module 1100 in order to obtain the device identification code ID (X) from the first wireless transceiving module 1100. When the second wireless transceiving module 1210 obtains the device identification code ID (X) from the first wireless transceiving module 1100, the processor 1220 may search for the at least one set of data to check whether the device identification code ID (X) matches to the pre-built identification code (s) ID1~IDm stored in the storage module 1230 (i.e., the steps S306 and S308). When the device identification code matches to the pre-built identification code, the flowchart goes to Step S310 in order to automatically execute the corresponding pre-assigned instruction; or when the device identification code does not match to the pre-built identification code, the flowchart goes to Step S320 in order not to execute the corresponding pre-assigned instruction. Moreover, the flowchart shown in FIG. 3 may be suitable for the first case and the second case mentioned above.

Figure 4:
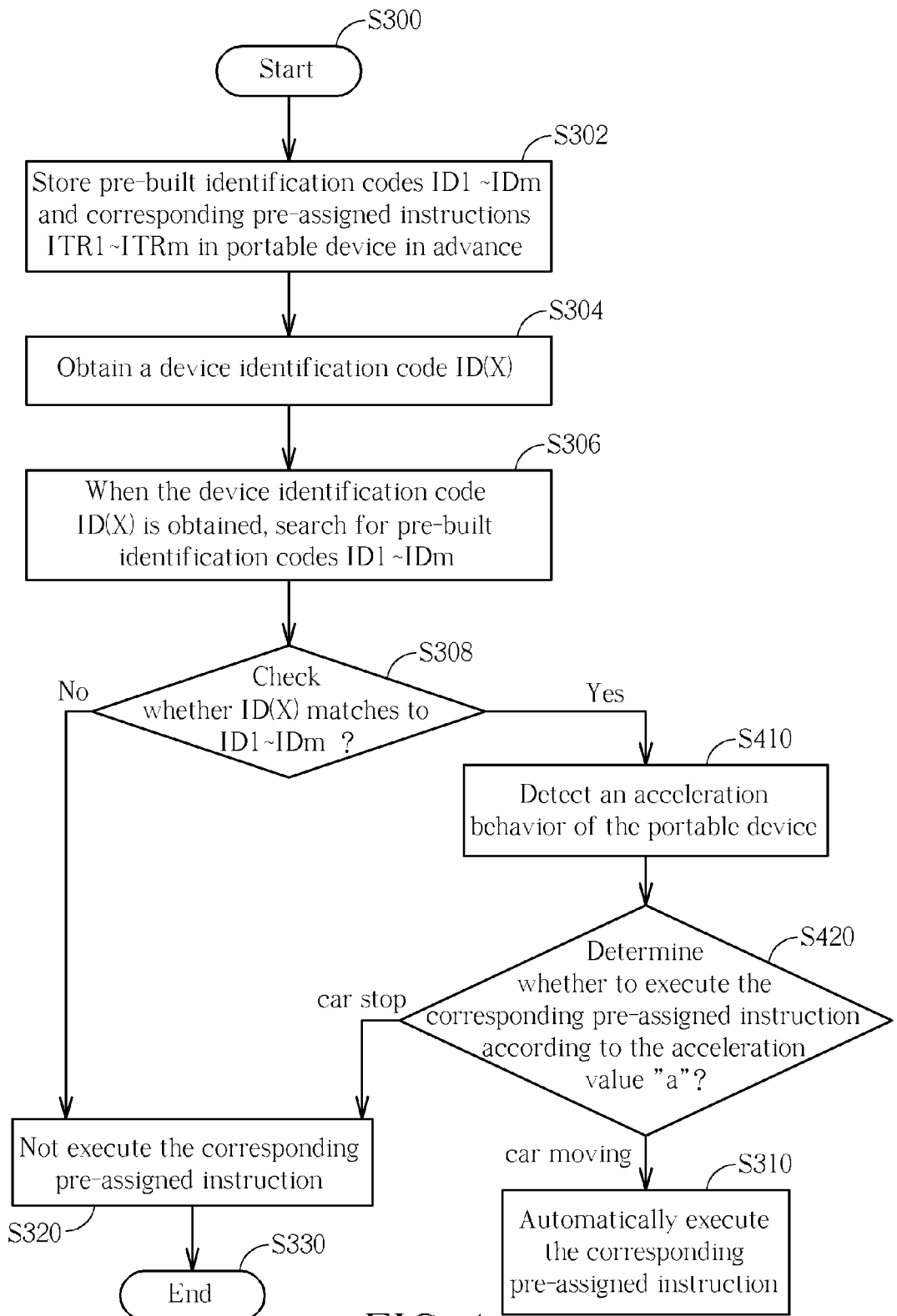
FIG. 4 is flowchart illustrating a method for controlling an electronic system according to another exemplary embodiment of the present disclosure.

Please refer to FIG. 4. FIG. 4 is flowchart illustrating a method for controlling an electronic system according to another exemplary embodiment of the present disclosure. The method includes, but is not limited to, the following steps:

Step S300: Start.

Step S302: Store at least one set of data in the portable device in advance, wherein each set of data comprises a pre-built identification code and a corresponding pre-assigned instruction.

Step S304: Communicate with the first wireless transceiving module in order to obtain the device identification code.

Step S306: When the device identification code is obtained from the first wireless transceiving module, search for the at least one set of data.

Step S308: Check whether the device identification code matches to the pre-built identification code. When the device identification code matches to the pre-built identification code, go to Step S410; otherwise, go the Step S320.

Step S410: Detect an acceleration behavior of the portable device.

Step S420: Determine whether to execute the corresponding pre-assigned instruction according to the acceleration behavior. When the acceleration behavior is determined to be car stop, go to Step S320; when the acceleration behavior is determined to be car moving, go the Step S310.

Step S310: Automatically execute the corresponding pre-assigned instruction.

Step S320: Not execute the corresponding pre-assigned instruction.

Step S330: End.

The steps of the flowchart shown in FIG. 4 is similar to that shown in FIG. 3, and the difference between them is that a speed detecting function (i.e., the steps S410 and S420) is added into the flowchart shown in FIG. 4. How each element operates may be known by combining the steps shown in FIG. 4 and the elements shown in FIG. 2. Be noted that the step S410 is executed by the acceleration detector 2240, and the step S420 is executed by the processor 2220. In details, in Step S302, the storage module 1230 may store at least one set of data, wherein each set of data may comprise a pre-built identification code (e.g., ID1~IDm) and a corresponding pre-assigned instruction (e.g. ITR1~ITRm). In Step S304, the second wireless transceiving module 1210 may be used for communicating with the first wireless transceiving module 1100 in order to obtain the device identification code ID (X) from the first wireless transceiving module 1100. When the second wireless transceiving module 1210 obtains the device identification code ID (X) from the first wireless transceiving module 1100, the processor 1220 may search for the at least one set of data to check whether the device identification code ID (X) matches to the pre-built identification code(s) ID1~IDm stored in the storage module 1230 (i.e., the steps S306 and S308). When the device identification code matches to the pre-built identification code, the flowchart goes to Step S410; or when the device identification code does not match to the pre-built identification code, the flowchart goes to Step S320. In this case, the acceleration detector 2240 may detect an acceleration behavior of the portable device 2200 (i.e., the Step S410); and the processor 2220 may determine whether to execute the corresponding pre-assigned instruction ITR1~ITRm according to the acceleration behavior (i.e., the step S420). When the acceleration behavior is determined to be car moving, the flowchart goes to Step S310 in order to automatically execute the corresponding pre-assigned instruction; or when the acceleration behavior is determined to be car stop, the flowchart goes to Step S320 in order not to execute the corresponding pre-assigned instruction. Moreover, the flowchart shown in FIG. 4 may be suitable for the third case mentioned above.

These methods may include other intermediate steps or several steps may be merged into a single step without departing from the spirit of the present disclosure, which also belongs to the scope of the present disclosure. For example, a step of activating the second wireless transceiving module and/or the acceleration detector only when a command related to the corresponding application (such as, launching a SMS program or receiving an incoming call) is received may be inserted before the step S304 of the flowcharts shown in FIG. 3 and FIG. 4, and thus a goal of saving the power consumption of the portable device may be achieved.

Figure 5A:
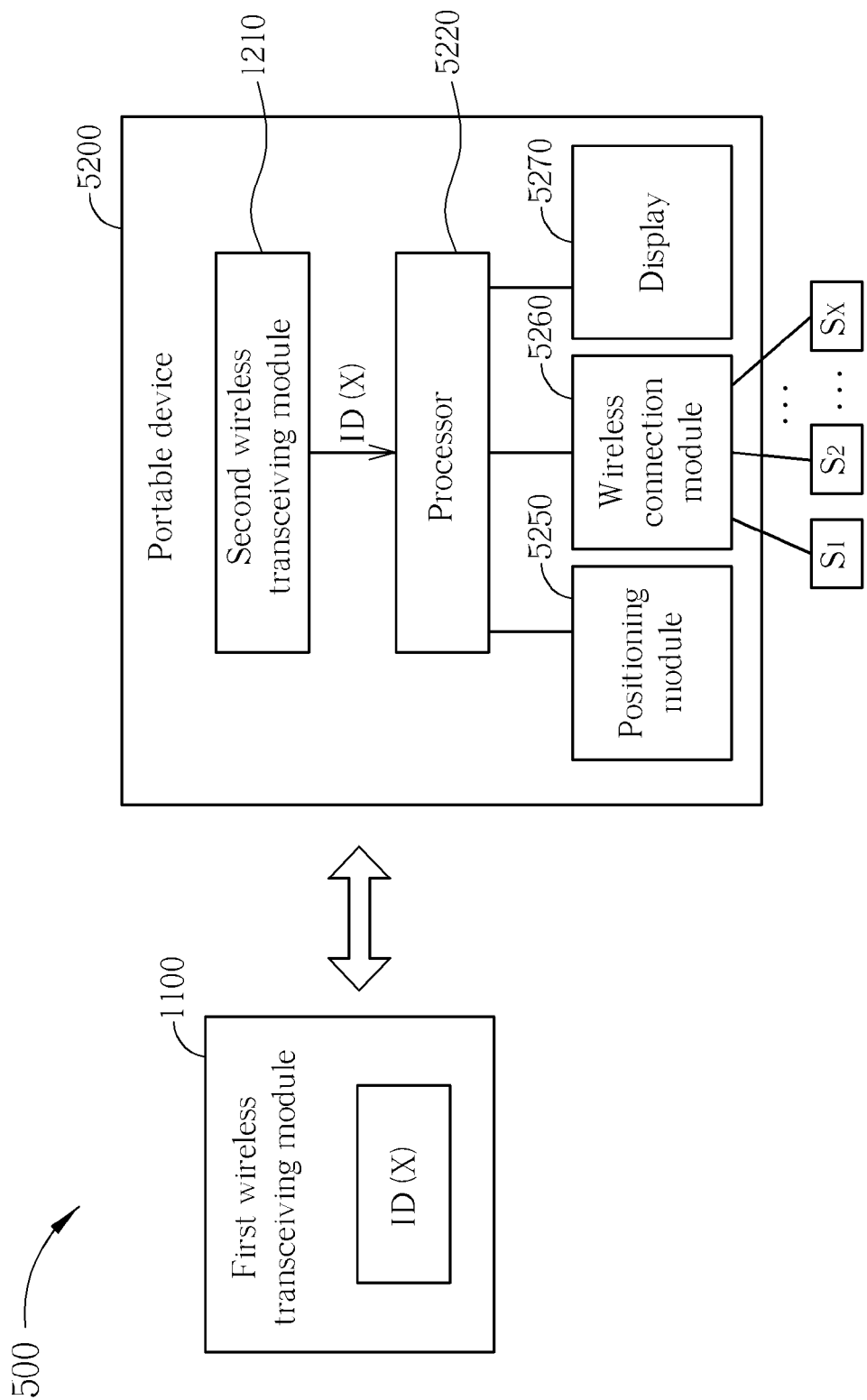
FIG. 5A is a block diagram of an electronic system.

Moreover, please refer to FIG. 5A. FIG. 5A is a block diagram of an electronic system 500 according to another embodiment of the present disclosure. In FIG. 5, the architecture of the electronic system 500 is similar to that of the electronic system 100, and thus signals and components with similar functions are denoted by the same symbols. The difference between the electronic system 500 and the electronic system 100 is that a portable device 5200 of the electronic system 500 further includes a positioning module 5250 and a wireless connection module 5260, and does not include the storage module 1230. Under such a configuration, when the second wireless transceiving module 1210 obtains the device identification code ID(X) from the first wireless transceiving module 1100, the processor 5220 checks whether the device identification code ID(X) matches to a pre-built identification code ID(Y); and when the device identification code ID (X) matches to the pre-built identification code ID (Y), the portable device 5200 automatically determines a position P of the portable device 5200 with the positioning module 5250, and displays a map related to the position of the portable device 5200 in a display 5270.

Figure 5B:
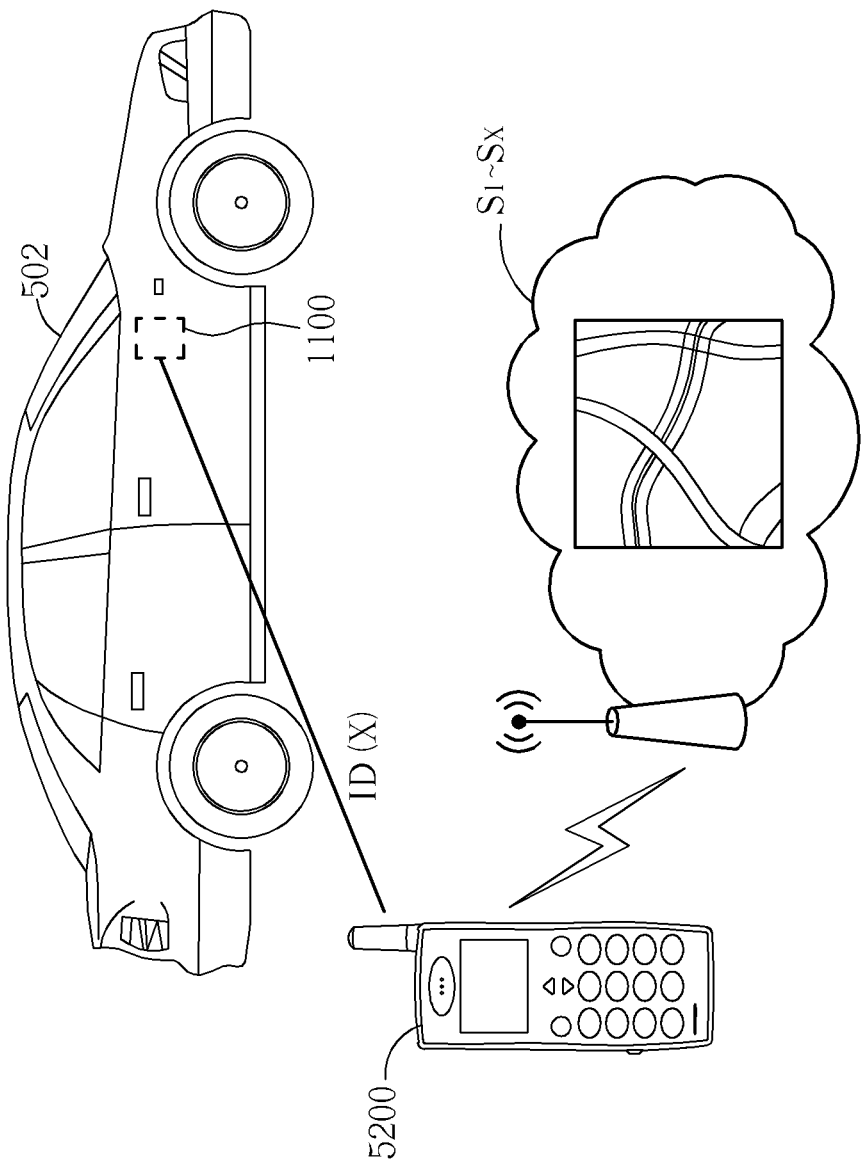
FIG. 5B is an exemplary operation of the electronic system shown in FIG. 5A.

For example, please further refer to FIG. 5B with FIG. 5A. FIG. 5B is an exemplary operation of the electronic system 500. As shown in FIG. 5A-5B, if the first wireless transceiving module 1100, e.g. a Bluetooth dongle, is disposed on a transport (e.g., a car 502). When a user of the portable device 5200 gets into the car, the second wireless transceiving module 1210 may be able to search for the first wireless transceiving module 1100 so as to obtain the device identification code ID (X) from the first wireless transceiving module 1100. At this time, the processor 5220 checks whether the device identification code ID (X) matches to the pre-built identification code ID (Y). Under this condition, when the device identification code ID (X) matches to the pre-built identification code ID (Y), the portable device 5200 activates the positioning module 5250 and the wireless connection module 5260.

The positioning module 5250 may comprise multiple positioning systems at same time. The processor 5220 of the portable device 5200 will be able to select a desirable positioning system for determining the position of the portable device 5200 depending on the location, signal strength, precision requirement and availability. A positioning system may be a global positioning system (GPS) module for determining the position of the portable device 5200 via GPS, or an assisted global positioning system (AGPS) module, for determining the position of the portable device 5200 via AGPS through the use of the wireless connection module 5260, e.g. Mobile Station Assisted (MSA) or Mobile Station Based (MSB), wherein the AGPS module may determine the position of the portable device 5200 with less time.

In detail, Standalone GPS provides first position in approximately 30-40 seconds. A Standalone GPS system needs orbital information of the satellites to calculate the current position. The data rate of the satellite signal is only 50 b/s, so downloading orbital information like ephemeris and almanac directly from satellites typically takes a long time. In addition to GPS, other systems are in use or under development. The Russian GLObal NAvigation Satellite System (GLONASS) was in use by only the Russian military, until it was made fully available to civilians in 2007. There are also the planned European Union Galileo positioning system, Chinese Compass navigation system, and Indian Regional Navigational Satellite System.

In AGPS, the Network Operator deploys an AGPS server. These AGPS servers download the orbital information from the satellite and store it in the database. An AGPS capable device, i.e. the portable device 520 with the AGPS module, may connect to these servers and download this information using Mobile Network radio bearers such as GSM, CDMA, WCDMA, LTE or even using other wireless radio bearers such as Wi-Fi. Usually the data rate of these bearers is high, hence downloading orbital information takes less time. Therefore, if the positioning module 5250 is an assisted global positioning system (AGPS) module, the positioning module 5250 needs to download orbital information from AGPS servers through the use of the wireless connection module 5260 to determine the position of the portable device 5200 via AGPS.

On the other hand, the wireless connection module 5260 transmits data of the position to servers $S_1$-$S_x$, and requests information related to the position from the servers $S_1$-$S_x$, wherein the servers $S_1$-$S_x$ may be a map server, e.g. a Google map server, a news server, an independent traffic server, a mail server and a calendar sever, and thus the information related to the position may be the map related to the position, a traffic information and a travel time to the favorite position information. Then, the portable device 5200 displays the map related to the position of the portable device 5200 and overlaps other information related to the position, e.g. the traffic information and the travel time to the favorite position information, with the map related to the position of the portable device 5200 on the display 5270.

Noticeably, in the above embodiment, the map related to the position and other information related to the position are requested from the servers $S_1$-$S_x$. However, in another embodiment, the wireless connection module 5260 may only request the map related to the position from the map server without requesting other information related to the position for display. Besides, in a further embodiment, rather than including the wireless connection module 5260 for requesting the map related to the position from the map server, the portable device 5200 further includes a map storage unit (not shown) for storing a plurality of maps, and providing the map related to the position of the portable device 5200, and thus the portable device 5200 may derive the map related to the position internally. Moreover, the display 5270 is included in the portable device 5200 in the above embodiment, but the display 5270 may be included in an external device, e.g. an on-board unit (OBU) of the car 502, in other embodiments, wherein the portable device 5200 transmits the map related to the position and other information related to the position to the external device for display. Furthermore, the portable device 5200 may also include the storage module 1230, and related operations may be derived by referring to the above description, which are not narrated hereinafter.

Figure 6:
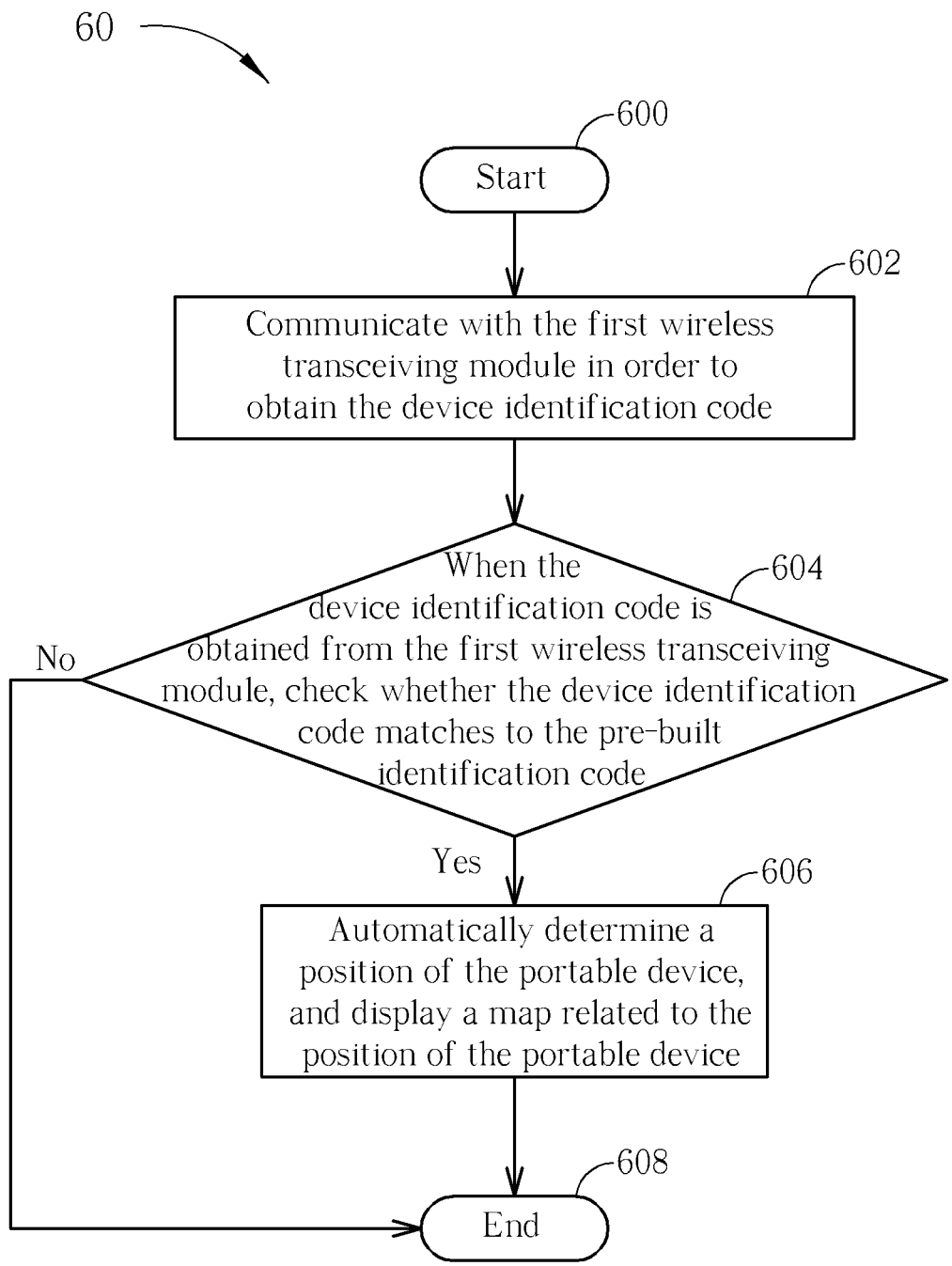
FIG. 6 is flowchart illustrating a method for controlling the electronic system shown in FIG. 5A according to an exemplary embodiment of the present disclosure.

Please refer to FIG. 6. FIG. 6 is flowchart illustrating a process 60 for controlling the electronic system 500 according to another exemplary embodiment of the present disclosure. The process 60 includes, but is not limited to, the following steps:

Step 600: Start.

Step 602: Communicate with the first wireless transceiving module in order to obtain the device identification code.

Step 604: When the device identification code is obtained from the first wireless transceiving module, check whether the device identification code matches to the pre-built identification code. When the device identification code matches to the pre-built identification code, go to Step 506; otherwise, go the Step 508.

Step 606: Automatically determine a position of the portable device, and display a map related to the position of the portable device.

Step 608: End.

Details of the process 60 may be derived by referring to the operations of the electronic system 500, and are not narrated hereinafter.

In summary, the disclosure provides an electronic system and a related controlling method. By storing the pre-built identification codes ID1~IDm in the portable device in advance, the portable device may be able to automatically execute the corresponding pre-assigned instructions ITR1~ITRm when the device identification code ID(X) matches to one of the pre-built identification codes ID1~IDm. As a result, the user does not need to enable or disable the corresponding application(s) manually, such as disabling a SMS program or enabling a mute function of the portable device. Additionally, in order to save power consumption, the second wireless transceiving module 1210 and/or the acceleration detector 2240 may be designed to be activated only when a command related to the corresponding application is received. Therefore, the convenience of the portable device may be substantially improved.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. An electronic system, comprising:
  a first wireless transceiving module, having a device identification code; and
  a portable device, comprising:
    a display;
    a second wireless transceiving module, for communicating with the first wireless transceiving module in order to obtain the device identification code from the first wireless transceiving module;
    a positioning module;
    a wireless connection module, wirelessly connected to a map server for requesting a map related to the position of the portable device from the map server; and
    a processor, coupled to the second wireless transceiving module, the wireless connection module and the positioning module;
  wherein when the second wireless transceiving module obtains the device identification code from the first wireless transceiving module, the processor checks whether the device identification code matches to a pre-built identification code; and
  when the device identification code matches to the pre-built identification code, the processor activates the positioning module and determines the position of the portable device with the positioning module, and the processor requests the map related to the position of the portable device from the map server when the processor determines the position of the portable device via the positioning module and displays the map on the display.

2. The electronic system of claim 1, wherein the positioning module is a global positioning system (GPS) module, for determining the position of the portable device via GPS.

3. The electronic system of claim 1, wherein an external device comprises the display.

4. The electronic system of claim 1, wherein the positioning module is an assisted global positioning system (AGPS) module, for determining the position of the portable device via AGPS through the use of the wireless connection module.

5. The electronic system of claim 1, wherein the at least one server comprises at least one of a map server, a news server, an independent traffic server, a mail server and a calendar sever.

6. The electronic system of claim 1, wherein the information related to the position further comprises at least one of a traffic information and a travel time to the favorite position information overlapped with the map related to the position of the portable device in the display.

7. The electronic system of claim 1, wherein the portable device further comprises a map storage unit, for storing a plurality of maps, and providing the map related to the position of the portable device.

8. The electronic system of claim 1, wherein the portable device is a cell phone, a personal digital assistant (PDA), a PDA phone, a smart phone, a hand held device, a e-book, a tablet, or a laptop.

9. The electronic system of claim 1, wherein the portable device comprise multiple positioning systems and the processor select a desirable positioning system for determining the position of the portable device.

10. A method for controlling an electronic system, the electronic system comprising a first wireless transceiving module having a device identification code and a portable device having a second wireless transceiving module, a processor, a wireless connection module and a positioning module, the method comprising the steps of:
wirelessly connecting to the first wireless transceiving module and obtaining the device identification code by the second wireless transceiving module;
determining the received device identification code matches to a pre-built identification code by the processor when the device identification code is obtained from the first wireless transceiving module;
determining a position of the portable device by the positioning module when the received device identification code matches to a pre-built identification code; and
requesting a map related to the position of the portable device from a map server by the wireless connection module and displaying the map on the portable device when the processor determines the position of the portable device via the positioning module.

11. The method of claim 10, wherein the step of determining the position of the portable device comprises:
determining the position of the portable device via global positioning system (GPS).

12. The method of claim 10, wherein the step of determining the position of the portable device comprises:
determining the position of the portable device via assisted global positioning system (AGPS).

13. The method of claim 11, wherein the at least one server comprises at least one of a map server, a news server, an independent traffic server, a mail server and a calendar sever.

14. The method of claim 10, wherein the information related to the position further comprises at least one of a traffic information and a travel time to the favorite position information, and the step of displaying the map related to the position of the portable device comprises:
overlapping the at least one of a traffic information and a travel time to the favorite position information on the map related to the position of the portable device.

15. The method of claim 10, wherein the step of determining the position of the portable device comprises:
determining and selecting a desirable positioning system from multiple positioning systems; and
determining the position of the portable device via the desirable positioning system.

* * * * *